United States Patent [19]

Torres

[11] Patent Number: 5,384,910
[45] Date of Patent: Jan. 24, 1995

[54] METHOD AND APPARATUS FOR FACILITATING OPERATOR RECONFIGURATION OF A GRAPHICAL USER INTERFACE IN A DATA PROCESSING SYSTEM

[75] Inventor: Robert J. Torres, Colleyville, Tex.

[73] Assignee: International Business Machines Corporation, Armonk, N.Y.

[21] Appl. No.: 999,032

[22] Filed: Dec. 31, 1992

[51] Int. Cl.[6] .......................................... G06F 15/403
[52] U.S. Cl. ................................................ 395/156
[58] Field of Search ............... 395/156, 155, 157, 161, 395/159

[56] References Cited

U.S. PATENT DOCUMENTS

5,040,131  8/1991  Torres ............................ 395/156 X

OTHER PUBLICATIONS

Microsoft Windows Step By Step (Trademark of Microsoft Cor.) pp. 3, 6–7, 38–39, 52–54.
Norton Desktop for Windows (Trademark of Sybex Inc.); 1991; p. 1.

*Primary Examiner*—Mark K. Zimmerman
*Assistant Examiner*—Cliff N. Vo
*Attorney, Agent, or Firm*—Jonathan E. Jobe, Jr.; Melvin A. Hunn; Andrew J. Dillon

[57] ABSTRACT

A method and apparatus is provided for facilitating operator interaction with a data processing system which includes a menu-formatted graphical user interface. The menu-formatted graphical user interface is provided on a display in the data processing system for interaction with the operator, and includes a plurality of menu fields whose identities and display positions are determined by an initial display configuration. Additionally, a menu field palette is provided in the graphical user interface which includes at least one additional possible menu field. Operator input is monitored, and at least one of the following tasks are performed in response to a predetermined operator input: (1) including a particular one of the additional possible menu fields from the menu field palette in the menu-formatted graphical user interface, (2) removing a particular menu field from the menu-formatted graphical user interface, and (3) automatically providing a visual representation in the menu field palette of particular menu fields which have been included or removed from the menu-formatted graphical user interface.

14 Claims, 12 Drawing Sheets

METHOD AND APPARATUS FOR FACILITATING OPERATOR RECONFIGURATION OF A GRAPHICAL USER INTERFACE IN A DATA PROCESSING SYSTEM

BACKGROUND OF THE INVENTION

1. Technical Field

The present invention relates in general to graphical user interfaces which are utilized in data processing systems, and in particular to graphical user interfaces which include components which are menu-formatted and include a plurality of menu fields.

2. Description of the Related Art

Increasingly, the data processing industry has gravitated toward the use of graphical user interfaces to allow for the interaction between an operator and a data processing system. Typically, the graphical user interfaces include textual components and iconographic components. Many types of graphical user interfaces utilize a menu format which includes a plurality of menu fields arranged in a particular display configuration with textual and/or iconographic representations of information presented to the operator for utilization in interacting with the data processing system. Conventional approaches to menu design in graphical user interfaces require that all fields available to the operator be displayed simultaneously on the menu. Typically, such conventional approaches allow little or no operator input in the design and display of the menu-formatted graphical user interface.

This rigidity complicates menu design and utilization in a number of ways. First, fields must be grouped and ordered on the menu, by product developers who may fail to realize and account for operational difficulties due to the particular layout and configuration of the menu fields. Certainly, little opportunity is provided in conventional graphical user interface design for end-user input prior to finalization of a product. The result may be a cumbersome menu-formatted graphical user interface which discourages, rather than encourages, utilization of the particular software product. Second, as end-user sophistication increases, and the utilization of multiple workspace environments such as multi-tasking environments to accomplish data processing objectives increases, menu-formatted type graphical user interfaces have become increasingly complex and large, frequently providing the end users with a virtual blizzard of hierarchical relationships, operating options, and displays which are confusing and counter-intuitive, and thus inherently less useful to the end user. It is not uncommon for end users to perceive software products with menu-formatted graphical user interfaces as being constructed in an arbitrary and non-useful fashion. For all these reasons, many software products are difficult to learn and utilize, and correspondingly require considerable operator commitment in developing a basic skill set for manipulating the software product and obtaining data processing objectives.

The continued utilization of menu-formatted graphical user interfaces is predicated upon continuing efforts to "streamline" the interface and eliminate the ambiguities, arbitrary display features, as well as minimize operator confusion and maximizing the average end user's ability to develop a basic skill set for utilization of the software product.

SUMMARY OF THE INVENTION

It is one objective of the present invention to provide an improved graphical user interface which facilitates operator interaction with a data processing system, wherein a menu-formatted graphical user interface is provided to the operator, and includes a plurality of menu fields whose identity and display positions are determined by an initial display configuration, but which may be reconfigured in response to a predetermined operator input to (1) include a particular menu field in the menu-formatted graphical user interface, (2) remove a particular menu field from the menu-formatted graphical user interface, and (3) provide visual representations to the operator which indicate operator-initiated inclusion and removal operations.

It is yet another objective of the present invention to provide a graphical user interface for use in a data processing system which facilitates operator interaction with the data processing system, and which includes a menu-formatted graphical user interface which includes a plurality of menu fields whose identity and display positions are determined by an initial display configuration, but which can be reconfigured in response to a predetermined operator input to include or remove particular menu fields from the menu-formatted graphical user interface in response to direct manipulation operations of visual representations of the menu fields, including visual representations of certain available menu fields on a menu field palette which is also provided in the graphical user interface.

It is still another objective of the present invention to provide a menu-formatted graphical user interface which includes a number of available menu field options displayed in a menu field palette in the graphical user interface, which may be selected by the operator for inclusion and/or exclusion in the graphical user interface.

It is yet another objective of the present invention to provide a menu formatted graphical user interface which provides an end-user operator the capabilities of rearranging either or both of (1) the content, and (2) the physical arrangement of menu fields in the menu-formatted graphical users interface.

These and other objectives are achieved as is now described. When characterized as a method, the present invention is directed to a technique for providing a graphical user interface to facilitate operator interaction with the data processing system, and is composed of a number of method steps. A menu-formatted graphical user interface is provided, and displayed on the data processing system display. The menu-formatted graphical user interface includes a plurality of menu fields. The identity and display positions of these menu fields are determined by an initial display configuration. Typically, the initial display configuration may be established by the software product designer to provide a generic menu-formatted graphical user interface display which may be modified in response to operator input. In the preferred embodiment, a menu field palette is provided in the graphical user interface as a component thereof, which includes at least one additional possible menu field. The data processing system monitors operator input and performs at least one of the following tasks in response to a predetermined operator input:

(a) including a particular one of the additional possible menu fields from the menu field palette in the menu-formatted graphical user interface;

(b) removing a particular one of the plurality of menu fields from the menu-formatted graphical user interface;

(c) automatically providing a visual representation in the menu field palette of particular menu fields of the plurality of menu fields which are removed from the menu-formatted graphical user interface.

Still further in the preferred embodiment, menu fields are represented in the menu-formatted graphical user interface in at least one of (1) an iconographic representation format, and (2) a textual representation format. Generally, the menu field palette should be automatically provided as a component of the menu-formatted graphical user interface; in alternative embodiments, the menu field palette can be provided in response to a predetermined operator input, but is otherwise concealed from view until called for by the operator. In a preferred embodiment, two types of modification are allowed to the menu-formatted graphical user interface: permanent modification, and temporary or reversible modification. During a permanent modification operation, the initial display configuration is permanently altered in response to operator input; thereafter, each time the particular menu-formatted graphical user interface is called for display on a display of the data processing system, the modified display configuration will be displayed, instead of the initial (or "default") display configuration. During reversible modification operations, a modified display configuration may be provided each time the menu-formatted graphical user interface is called for display on a display of the data processing system, until operator input indicates that the initial display configuration should be returned to; thereafter, each time the menu-formatted graphical user interface is called for display on a display of the data processing system, the initial display configuration is utilized to determine the composition and display position of the various menu fields, and other components of the graphical user interface. In still further embodiments, a plurality of display configurations may be recorded in data processing memory, including the initial display configuration, and other display configurations determined by the end-user. A plurality of operator-initiated commands can be used to call a particular display for utilization. This feature allows for maximum flexibility in utilizing menu-formatted graphical user interfaces, and further allows for the "customization" of such menu-formatted graphical user interfaces.

In the preferred embodiment of the present invention, the operations of inclusion and removal of particular menu fields from the menu-formatted graphical user interface is accomplished by direct manipulation operations performed by the operator, such as a drag-and-drop operation. In addition, each actual or potential menu field in the menu-formatted graphical user interface is associated with one or more display attributes which are automatically implemented in any display of the particular menu field in the display of the data processing system. Also, preferably, the size of the graphical user interface display window is automatically adjusted in response to operator initiated inclusion or removal of particular menu fields. Additionally, the visual components of the graphical user interface are also automatically adjusted in size in the display in response to the operator-initiated inclusion or removal of a particular menu field. Preferably, once a menu field is included in the menu-formatted graphical user interface, operator interaction with that particular field is automatically "enabled" by the data processing system to allow for the utilization of that field for the recording and display of data. Conversely, once a menu field is removed from the menu-formatted graphical user interface, operator interaction with that particular menu field is preferably automatically "disabled".

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
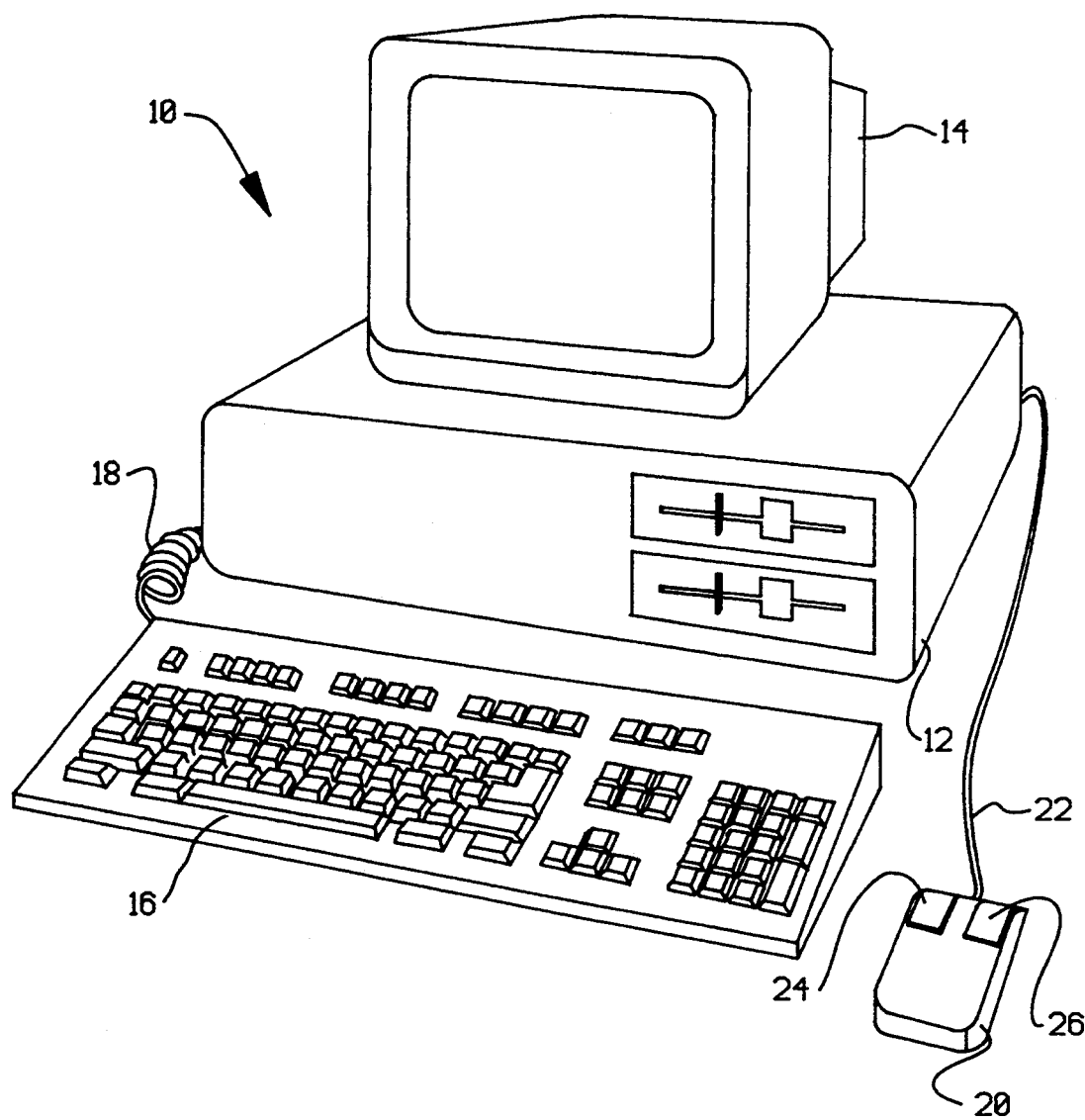
FIG. 1 is a perspective view of a data processing system which may be utilized to implement the method and apparatus of the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, N.Y.

Figure 2:
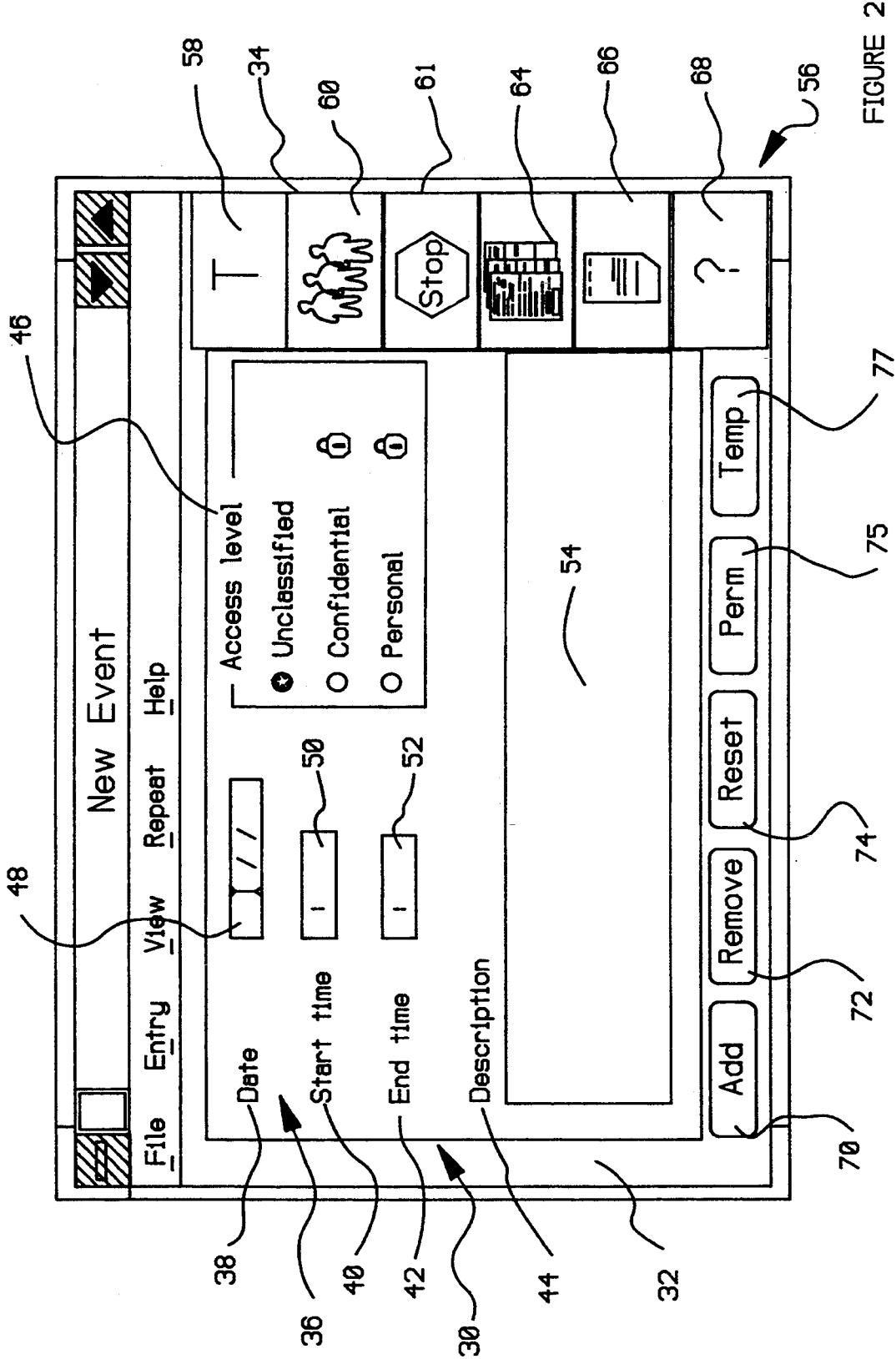
FIG. 2 is a representation of a menu-formatted graphical user interface, which is displayed on the display of the data processing system of FIG. 1, in accordance with the present invention.

In FIG. 2, menu-formatted graphical user interface 30 is depicted in workspace 32 of display 14 of data processing system 10. Workspace 32 is defined by window 34. While a single workspace is depicted in the view of FIG. 2, the present invention may be utilized in a multiple workspace environment, including a multitasking environment with multiple overlapping windows displayed on display 14 of data processing system 10. As is shown, a plurality of menu fields 36 are disposed within menu-formatted graphical user interface 30. The depicted fields include a "date" field 38, a "start time" 40 field, a "end time" 42 field, as well as a "description" 44 field and a "access level" 46 field. These fields together set forth necessary, or desirable, components of a scheduling program.

Date field 38 includes an input region 48 on the display which is adapted for receiving alphanumeric input from the operator through utilization of keyboard 16. Likewise, start time field 36, end time field 42, and description field 44 have corresponding input regions 50, 52, and 54. The "access level" menu field does not include input regions for receipt of alphanumeric character strings from keyboard 16 of data processing system 10; instead, it includes a plurality of textual and iconographic operator-actuable software buttons which may be selected through utilization of mouse 20 of data processing system 10. The buttons are identified with three levels of document classification, including: an "unclassified" classification, a "confidential" classification, and a "personal" classification. The operator may select one of these distinct classification levels through utilization of a graphical pointing device. The selected classification is indicated by highlighting of a feedback region associated with each classification. In the example of FIG. 2, the access level menu field indicates that the "unclassified" classification has been selected.

In addition, in accordance with the preferred embodiment of the present invention, menu-formatted graphical user interface 30 includes menu field palette 56 which includes a plurality of iconographic representations of various menu field options which are available to the end-user. In the example of FIG. 2, menu field palette 56 includes duration icon 58 which iconographically represents an available duration field, attendees icon 60 which iconographically represents an attendees field for receipt of information relating to the attendees at a particular scheduled meeting, a stop icon 61 which iconographically represents a data field for receipt of notes relating to the stopping time of a particular scheduled event, a reference calendar icon 64 which iconographically represents a calendar which identifies the scheduled event with respect to other scheduled events, and a help icon 66 which iconographically represents a help routine which can be utilized by the operator to determine the operation of the particular menu-formatted graphical user interface 30.

In accordance with the present invention, an end-user operator can select to perform one or more inclusion operations or one or more removal operations. An inclusion operation is the selection of one or more menu fields from menu field palette 56 and the inclusion of that particular menu field in the menu fields 36 which are displayed and available for operator interaction. A removal operation corresponds to the removal of a particular one of menu fields 36 from display. In the preferred embodiment of the present invention, the performance of either an inclusion operation or a removal operation will result in the automatic adjustment of menu field palette 56 in a manner which visually represents the utilization or nonutilization of a particular menu field. In the preferred embodiment of the present invention, the inclusion and removal operations are performed utilizing operator-actuable software buttons, including add button 70, remove button 72, and reset button 74, as will be explained herebelow.

Figure 3:
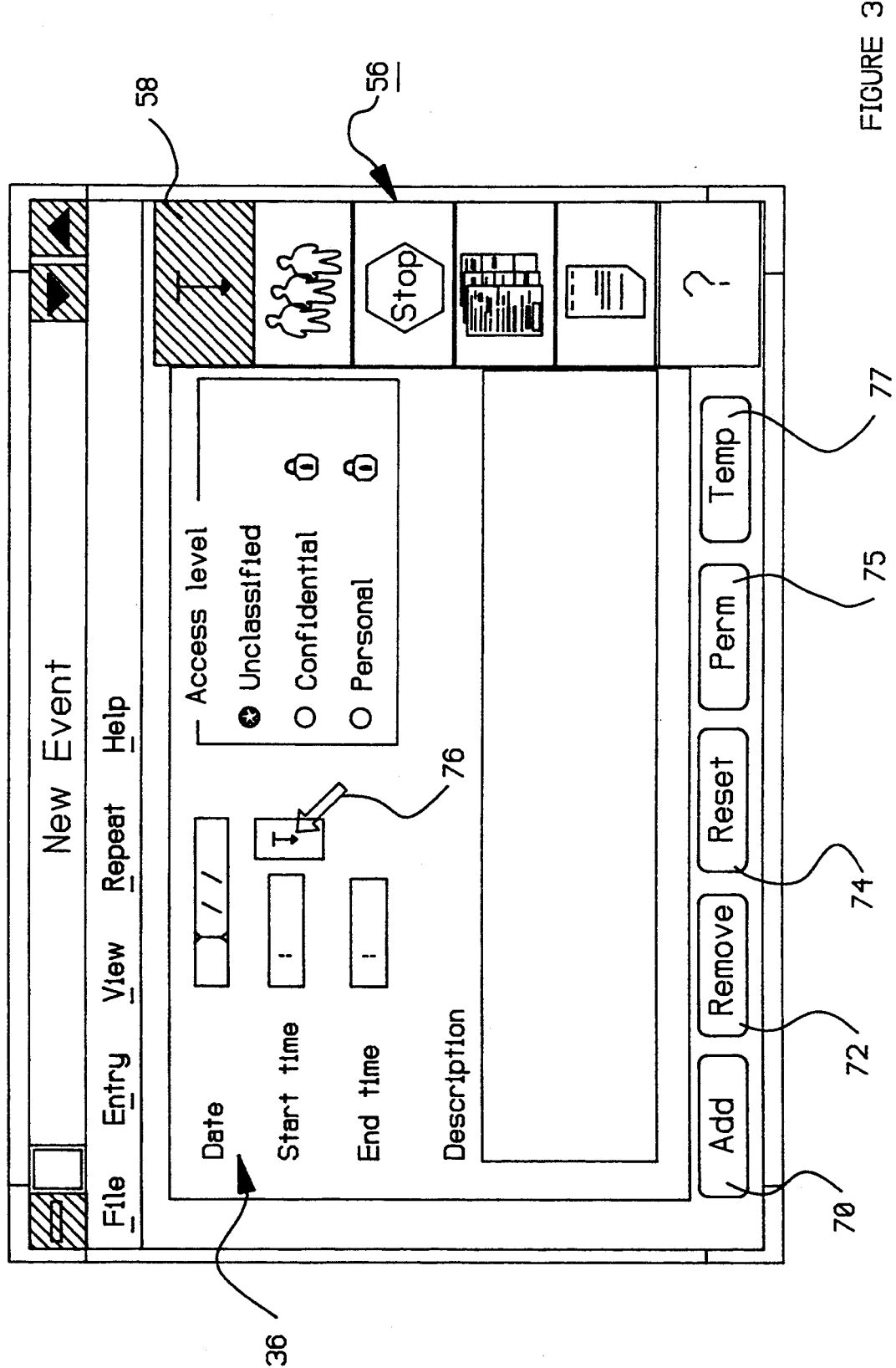
FIG. 3 is a representation of the utilization of the menu-formatted graphical user interface of the present invention to include a particular menu field.
Figure 4:
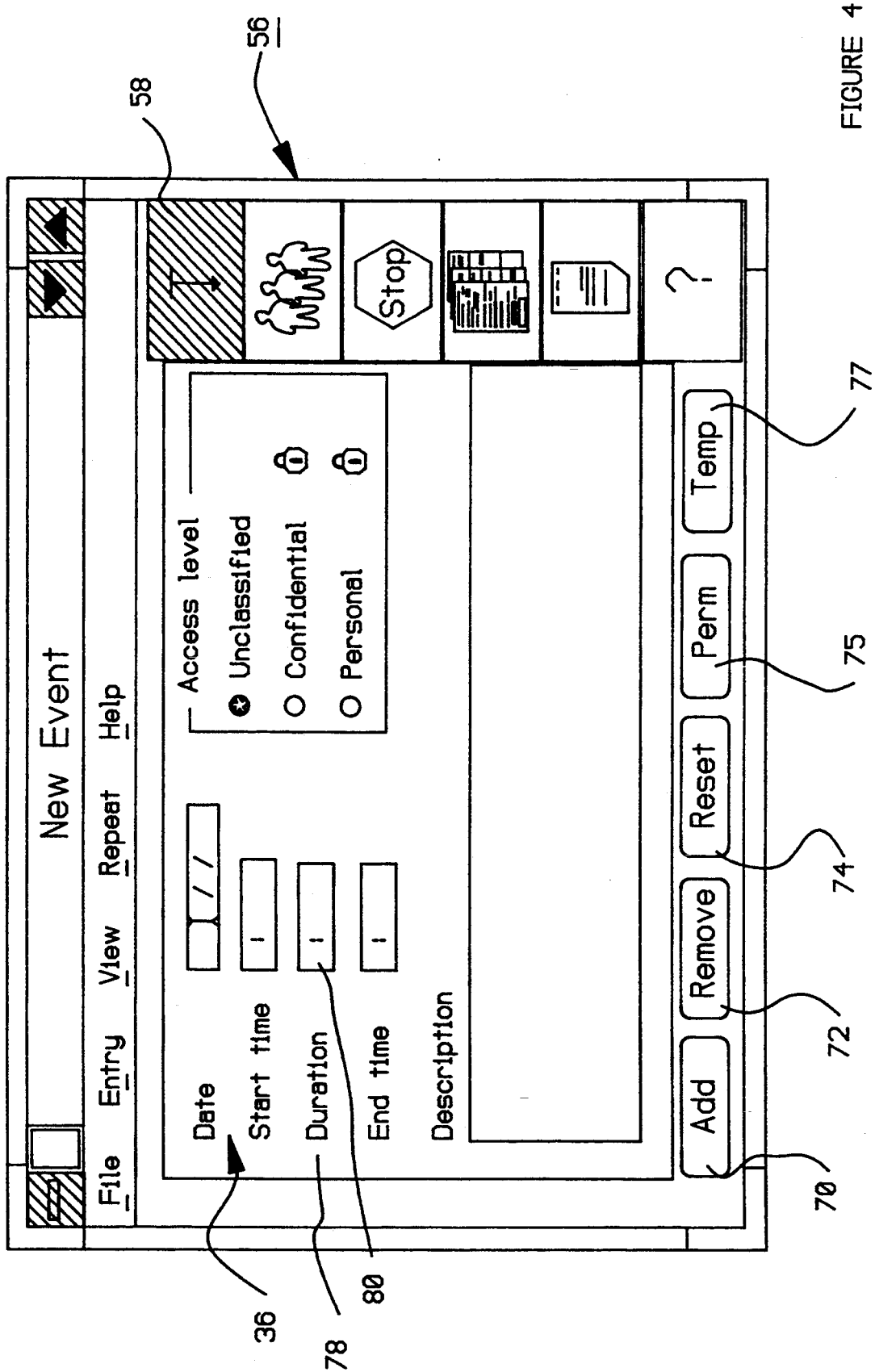
FIG. 4 is a depiction of the menu-formatted graphical user interface of the present invention, with a particular menu field included in the display as a consequence of the performance of the operation which is graphically depicted in FIG. 3.

The insertion and removal operations, in accordance with the present invention, can best be described with reference to FIGS. 3 through 6. FIGS. 3 and 4 illustrate the performance of an inclusion operation, while FIGS. 5 and 6 illustrate the performance of a removal operation.

With reference first to FIG. 3, in the event an operator desires to add a menu field which indicates the duration of a scheduled event, the operator would utilize graphical pointing device 76 (through mouse 20) to: (1) actuate add button 70 by locating graphical pointing device 76 over a portion of add button 70 and depressing one or more of the mouse buttons in a predetermined pattern, (2) locating graphical pointing device 76 over a portion of duration icon 58 of menu field palette 56, and selecting that particular menu field item from the menu field palette 56 by depressing one or more of the mouse buttons in a predetermined pattern, in order to initiate a direct icon manipulation operation, such as a drag-and-drop operation, (3) relocating graphical pointing device 76 from duration icon 58 to a selected region in workspace 32, and "dropping" the duration icon 58 at a selected location, by depressing one or more of the mouse buttons in a predetermined manner. In the example of FIGS. 3 and 4, this will result in the automatic inclusion of duration menu field 78 and corresponding input field 80, as is depicted in FIG. 4 in the array of menu fields 36 in a predetermined location. As is shown in FIG. 4, the duration menu field 78 is associated with input field 80 which is automatically enabled for operator interaction upon display. As is shown in both FIGS. 3 and 4, duration icon 58 is emphasized within menu field palette 56 to identify to the operator that the direct manipulation operation will include the duration icon 58. This emphasis is achieved by conventional means, such as high lighting duration icon 58 or causing duration icon 58, or a portion of duration icon 58, to "blink" within display 14 of data processing system 10. The highlighting or blinking action is graphically represented in FIGS. 3 and 4 by the shading which is superimposed upon duration icon 58.

Figure 5:
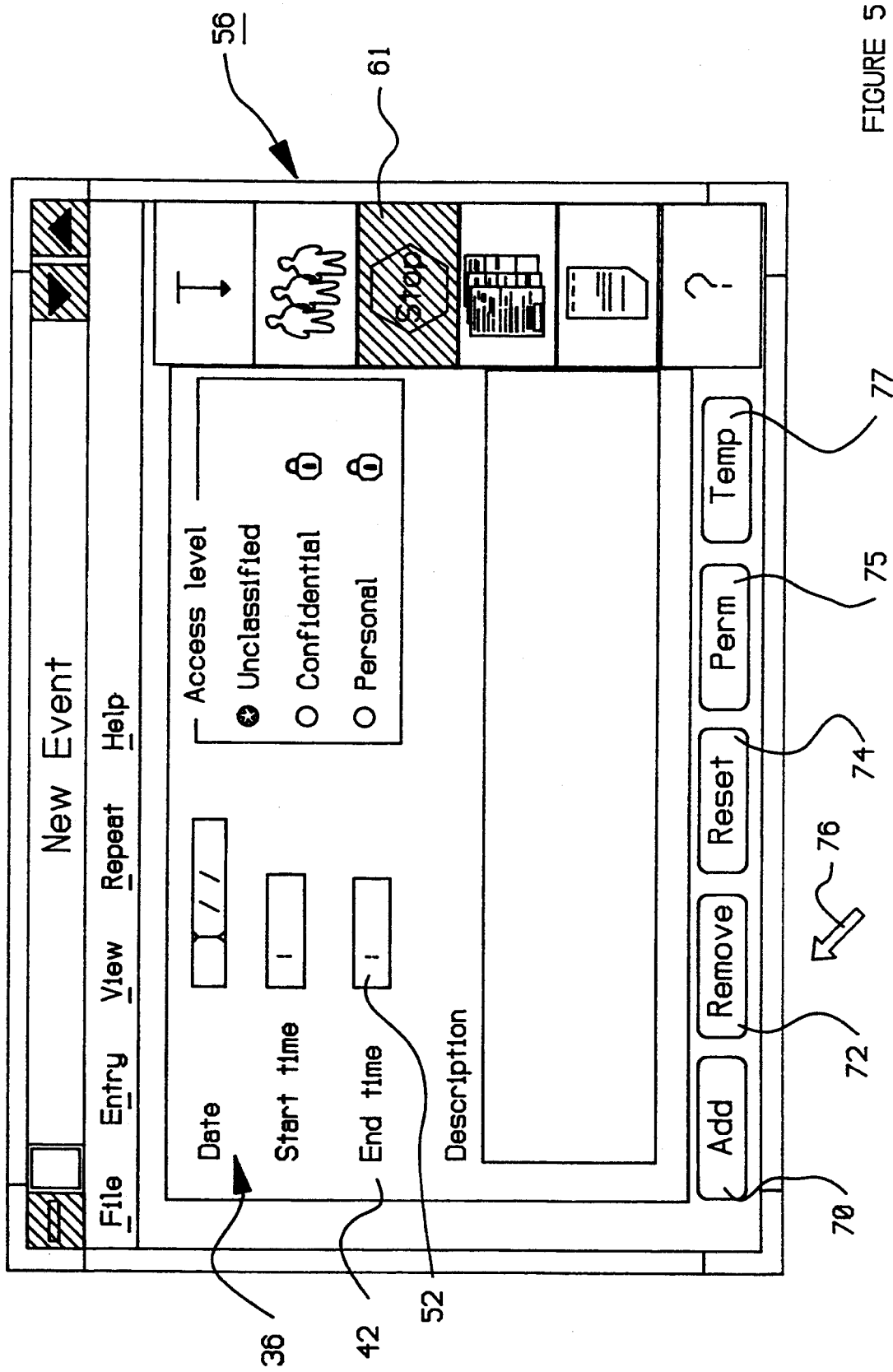
FIG. 5 is a depiction of the menu-formatted graphical user interface of the present invention during a menu field removal operation.
Figure 6:
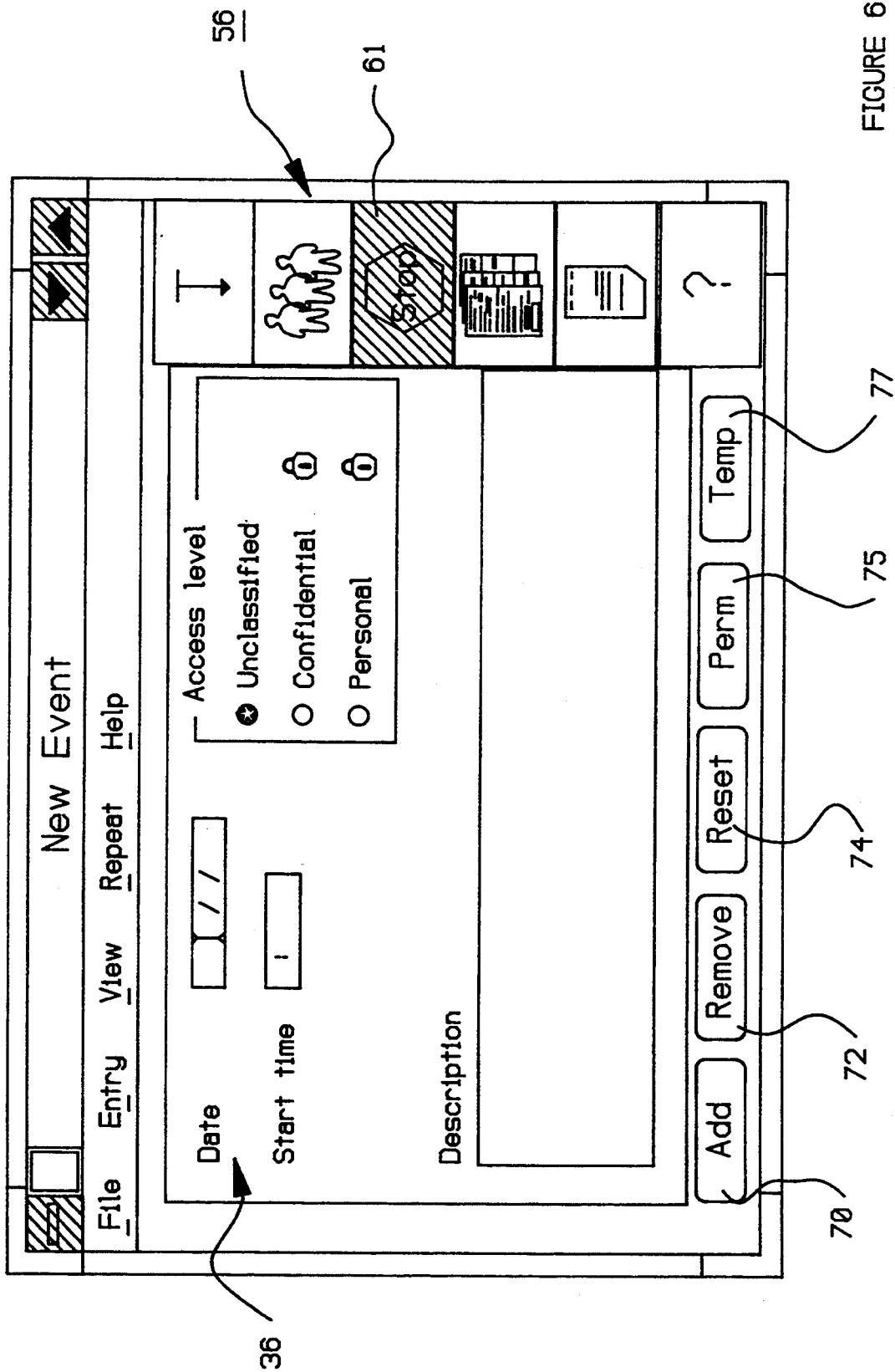
FIG. 6 is a depiction of the menu-formatted graphical user interface of the present invention after completion of the removal operation which is depicted in FIG. 5.

Turning now to FIGS. 5 and 6, an exemplary removal operation which is illustrated therein will now be described. During a removal operation: (1) graphical pointing device 76 is utilized to actuate removal button 72 by locating graphical pointing device 76 over a portion of removal button 72 and depressing one or more of the buttons on mouse 20 in a predetermined manner, (2) locating graphical pointing device 76 over the iconographic representation of the particular menu field which is sought to be removed; in this case, by placing graphical pointing device 76 over at least a portion of stop icon 61 within menu field palette 56, and selecting this particular icon by depressing one or more buttons on mouse 20 in a predetermined manner, to initiate a direct icon manipulation operation such as a drag-and-drop operation, and (3) relocating graphical pointing device 76 to a region proximate menu fields 36, and depressing one or more of the buttons on mouse 20 in a predetermined manner to perform the "dropping" action of the direct icon manipulation operation. In accordance with the present invention, stop icon 61 is differentiated from the remaining icons in menu field palette 56 by either highlighting or blinking operations, as was discussed above. As is shown in FIG. 6, performance of the removal operation results in removal of the end time field 42 and associated input region 52.

Several additional features of the present invention will now be discussed with simultaneous reference to FIGS. 2 through 6. As is shown, reset button 74 is provided. This button may be associated with a reset operation, wherein a previous, or initial, configuration of menu-formatted graphical user interface 30 is automatically returned to. For example, the menu-formatted graphical user interface 30 which is depicted in FIG. 2 may be automatically provided to the operator as an initial, or default, menu-formatted graphical user interface. Accordingly, each time the message-formatted graphical user interface 30 is called for display on display 14 of data processing system 10, the particular configuration shown in FIG. 2 will be automatically provided to the video display buffer. The operator may then perform various inclusion and removal operations to modify the configuration of menu-format graphical user interface 30, in accordance with his or her particular desires and operating needs. If the initial display configuration is desired in future operations, the operator can utilize graphical pointing device 76 to actuate reset button 74 to cause the automatic retrieval from memory, and display, of the initial display configuration of FIG. 2. In alternative embodiments, a "replay" button may be provided to allow the operator to scroll through a plurality of previously stored menu-formatted graphical user interface display configurations. This would allow the operator to have a "library" of display configurations for utilization at different times to obtain different operating objectives.

In still other embodiments of the present invention, permanent button 75 and temporary button 77 may also be provided in the menu-formatted graphical user interface, and may be selectively actuated by the operator through utilization of graphical pointing device 76 to define the nature of a particular modification of the menu-formatted graphical user interface 30. For example, the permanent button 75 may be actuated to indicate a permanent change in a previous, or initial, display configuration. Alternatively, the temporary button 77 may be actuated to indicate the temporary nature of a reconfiguration of the display of a menu-formatted graphical user interface A temporary modification may last for a predefined duration, for only the particular activity session which is presently occurring, or any other time period that can be defined by the product designer or end-user.

Figure 7:
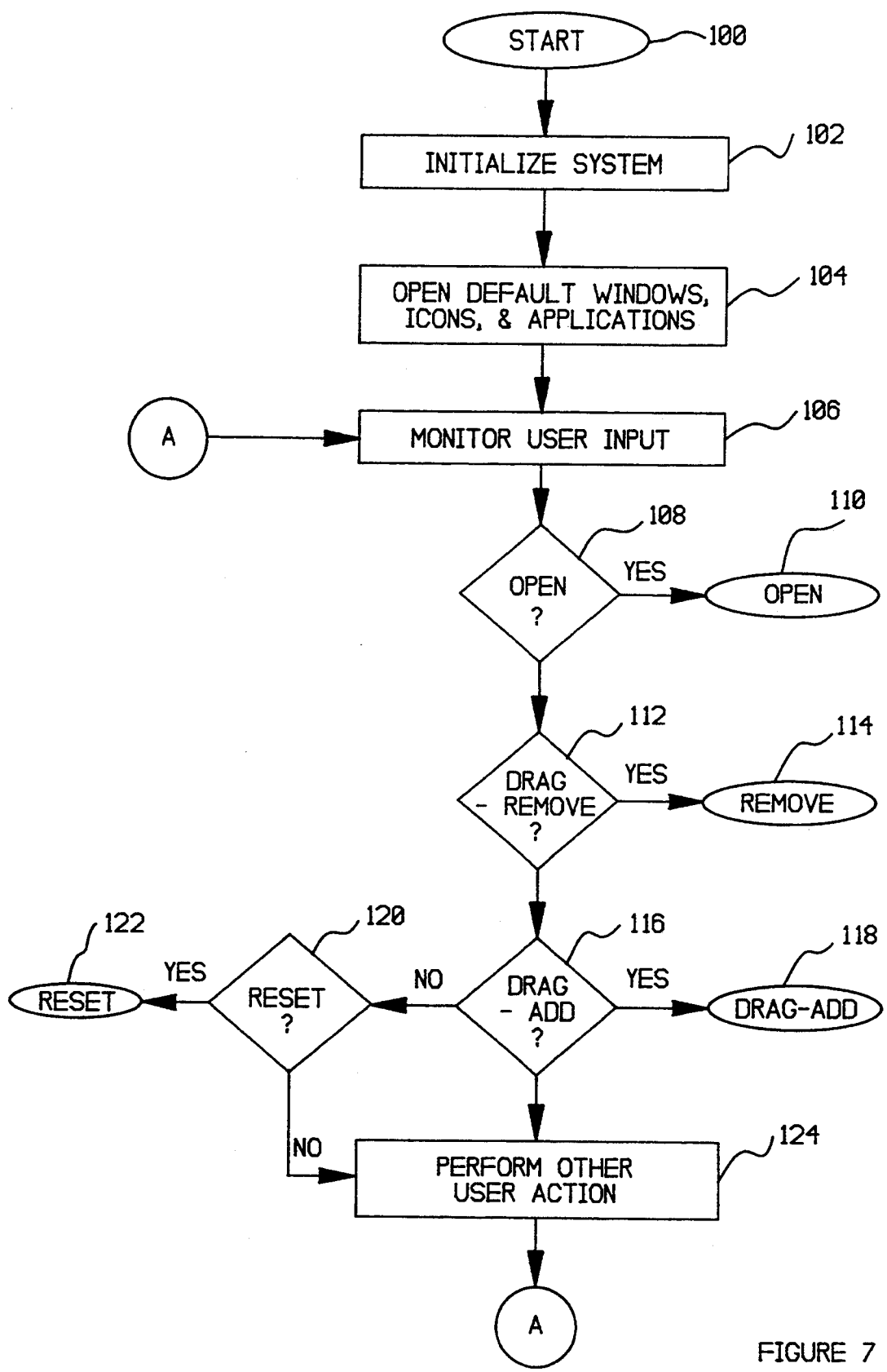
FIG. 7 is a flowchart representation of a broad overview of the operational components of the preferred embodiment of the menu-formatted graphical user interface of the present invention, with FIGS. 8a–8b, 9, 10, and 11 providing detailed views of portions depicted therein.

The software routines which implement the present invention are depicted in flowchart form in FIGS. 7 through 11, and will now be described. FIG. 7 provides a broad overview of the software implementation of the present invention. The process starts at software block 100, and continues at software block 102 by initializing data processing system 10. In accordance with software block 104, default windows, icons, and applications are opened, including, if appropriate, the menu-formatted graphical user interface 30. Data processing system 10 continually monitors for four broad types of activity requests, including: an operator initiated request for opening of the menu-formatted graphical user interface 30, as determined by software block 108; an operator request for performance of a removal operation, as determined by software block 112; an operator request for performance of an inclusion operation, as determined by software block 116; and an operator request for resetting or returning to a previous display configuration, as determined by software block 120.

Figure 8A:
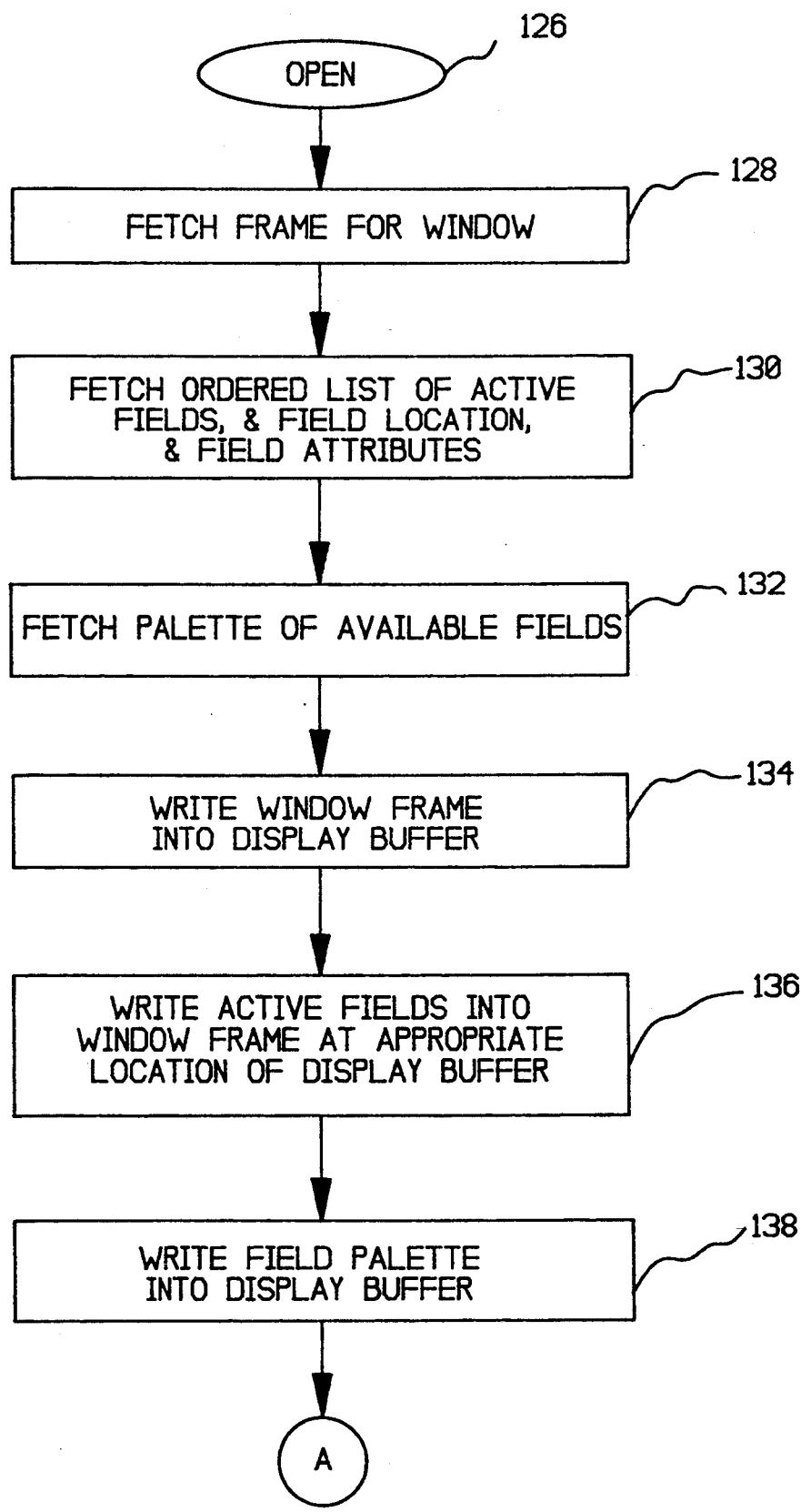
Figure 8B:
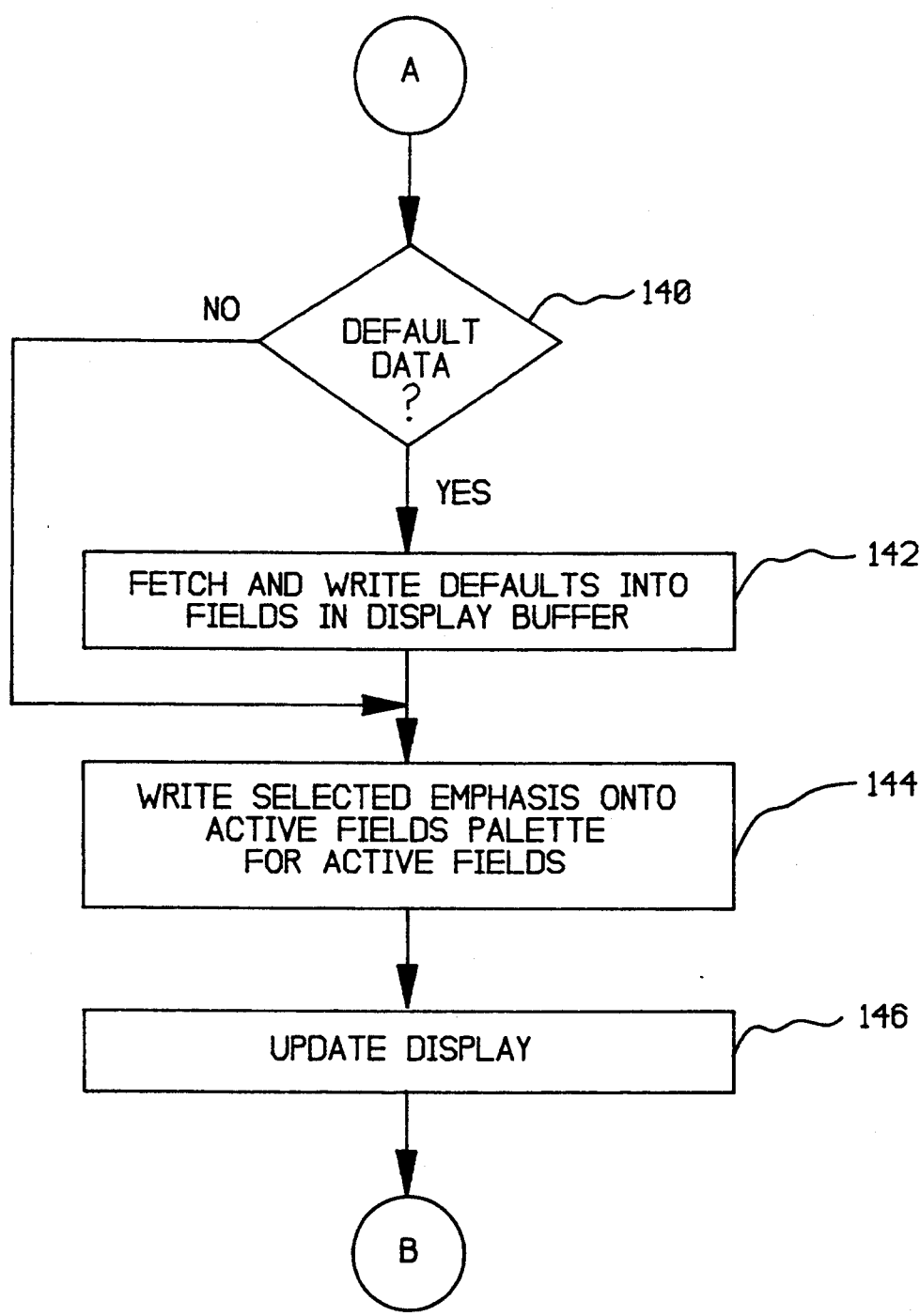

A determination that the operator is requesting opening of the menu-formatted graphical user interface 30, in software block 108, results in performance of the open operation in accordance with software block 110, which is depicted in greater detail in FIG. 8. A determination that the operator is requesting a removal operation, as determined in software block 112, results in performance of the removal operation, in accordance with software block 114, which is depicted in further detail in FIG. 9. A determination that the operator is requesting an inclusion operation, as determined by software block 116, results in performance of the inclusion operation, in accordance with drag-add software block 118, which is depicted in greater detail in FIG. 10. A determination that the operator is requesting a reset operation, as determined by software block 120, results in performance of the reset operation, in accordance with software block 122, which is set forth in greater detail in FIG. 11.

In accordance with software block 124, data processing system 10 performs all other user actions which are requested, and continually returns to software block 106 to monitor for user input regarding the menu-formatted graphical user interface 30.

Turning next to FIG. 8, a menu-formatted graphical user interface 30 in accordance with the present invention is opened in accordance with the flowchart representation contained therein. The process begins at software block 126, and continues at software block 128 wherein the video frame for the work area defined by the display window is fetched by data processing system 10. Then, in accordance with software block 130, data processing system 10 fetches the ordered list of active fields, the locations for each of the active fields, and all field attributes, such as field length, width, and command and control functions and attributes. Next, in accordance with software block 132, data processing system 10 fetches a menu field palette 56 of the available fields for automatic display on display 14 of data processing system 10. The window frame is then moved to the display buffer, in accordance with software block 134. Next, in accordance with software block 136, the active fields are written into the window frame at the appropriate location of the display buffer. Next, in accordance with software block 138, data processing system 10 writes the field palette into the display buffer. In software block 140, data processing system 10 determines whether default data exists, such as a default or initial display configuration. If so, the process continues at software block 142 by fetching and writing default values into the fields in the appropriate locations of the display buffer. Next in software block 144, data processing system 10 writes selected emphasis onto the active field palettes for the active fields, and updates the video display periodically, in accordance with software block 146.

Figure 9:
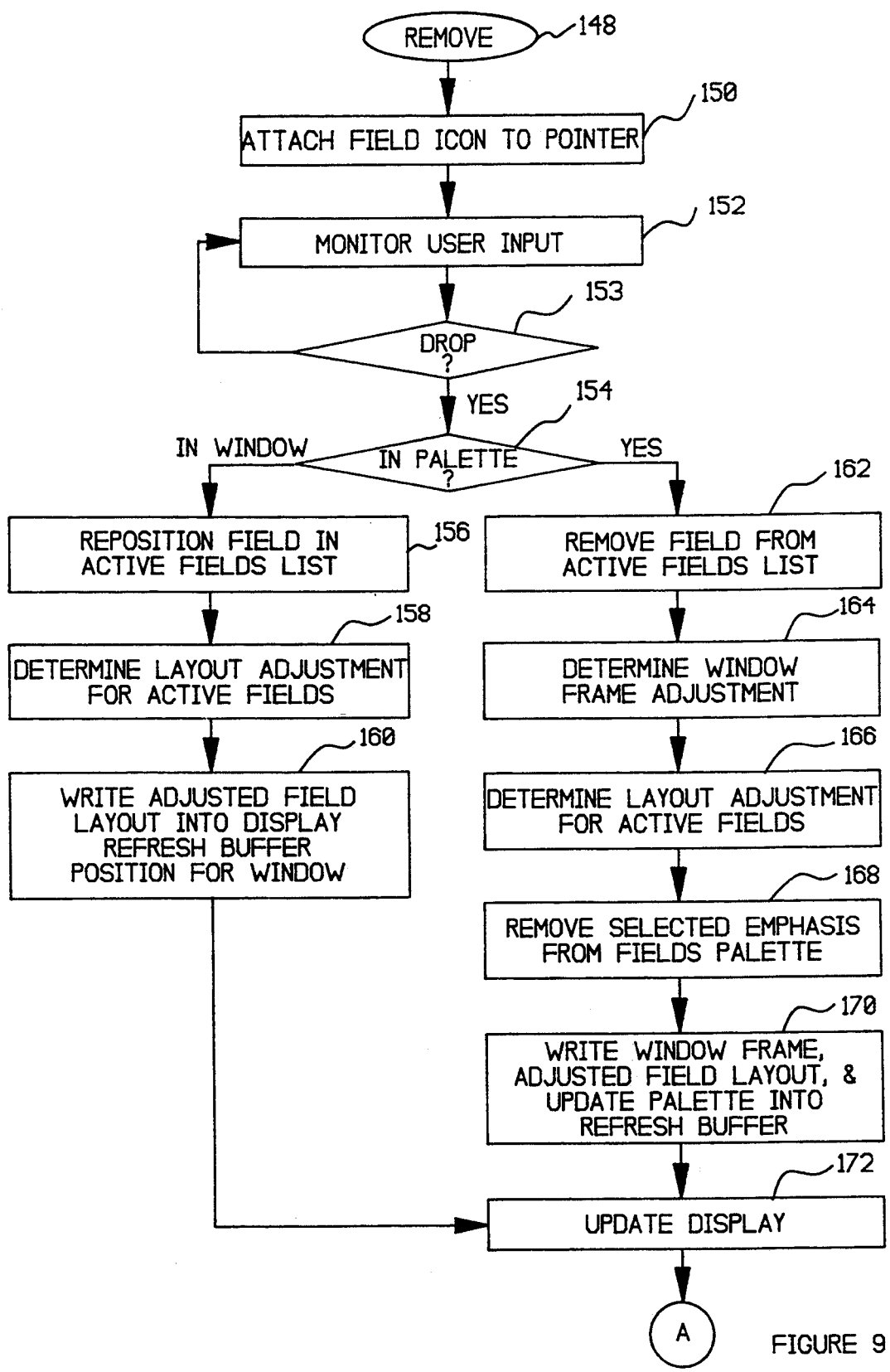

FIG. 9 will now be utilized to provide an overview of the process of removing a particular menu field from a message desk formatted graphical user interface 30, in accordance with the present invention. The process begins at software block 148, and continues at software block 150, wherein data processing system 10 notes the attachment of a particular field icon to graphical pointing device 76. Then in software block 152, data processing system 10 monitors for user input, to determine, in accordance with software block 152, whether a drop operation has occurred. If a drop operation has occurred, data processing system 10 determines in software block 154 whether the drop has occurred within the display window or in the menu field palette 56. If the drop operation occurs in a display portion of menu-formatted graphical user interface 30, the operations of software blocks 156, 158, and 160 are preformed. Specifically, the particular field attributable to the icon is repositioned in an active field list. Then, the layout of the window is adjusted to accommodate the active fields. This layout adjustment includes automatic resizing of the window (and defined workspace) as well as resizing of various components of the menu-formatted graphical user interface in order to accommodate all the active menu fields in a manner which facilitates and enhances the visual presentation of information to the operator. Then, the adjusted field layout is written into a display buffer and periodically refreshed to provide a display to the operator.

If, however, it is determined in software block 164 that an icon has been dropped into the menu field palette 56, the operations of software blocks 162, 164, 166, 168, 170, and 172 are performed. First, the menu field is removed from the "active fields" list. Then, any necessary window frame adjustments are determined. Then, any layout adjustments necessary to accommodate the changes are determined. Selected emphasis is then removed from the selected field palettes to provide feedback to the operator that the task has been performed. Finally, the window frame, adjusted field layout, and updated palette are written into a refresh buffer, and in accordance with software block 172 periodically updated.

Figure 10:
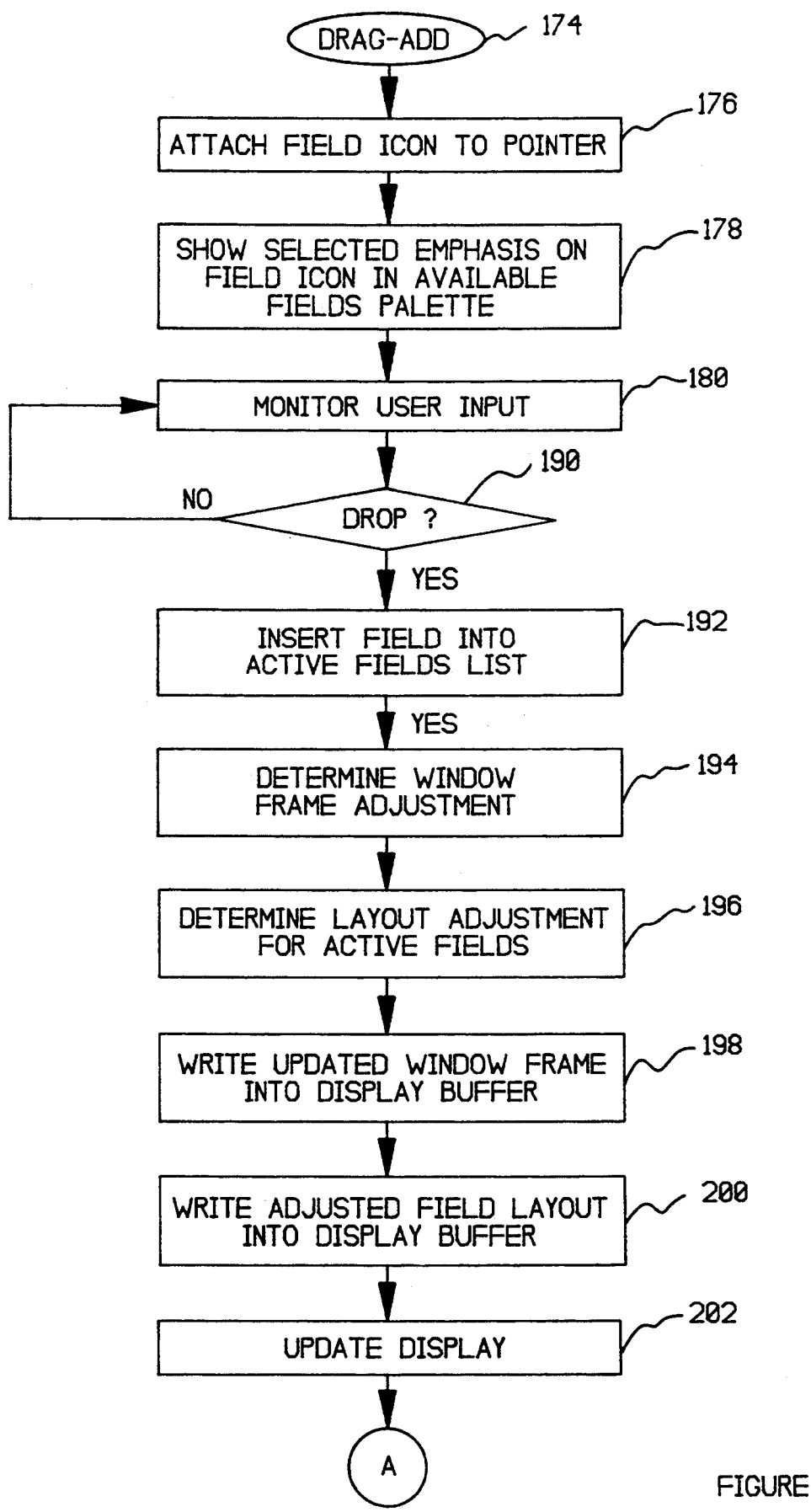

FIG. 10 provides a flowchart representation of the insertion operation, which begins at software block 174. In accordance with software block 176, data processing system 10 notes the attachment of a field icon to graphical pointing deice 76. Then, in accordance with software block 178, selected emphasis is provided to the field icon in menu field palette 56. In accordance with software block 180, data processing system 10 continually monitors for user input, until it is determined at software block 190 that a "drop" operation has occurred. Then, the operations of software blocks 192, 194, 196, 198, 200, and 202 are performed sequentially. The particular field which has been added is first inserted into an "active fields" list. The particular window frame adjustment which is necessary is then determined, as well as any particular layout adjustments which are required for performing the insertion operation. In accordance with software blocks 198, 200, and 202, the updated window frame and adjusted field layout are written into a display buffer which is then periodically updated.

Figure 11:
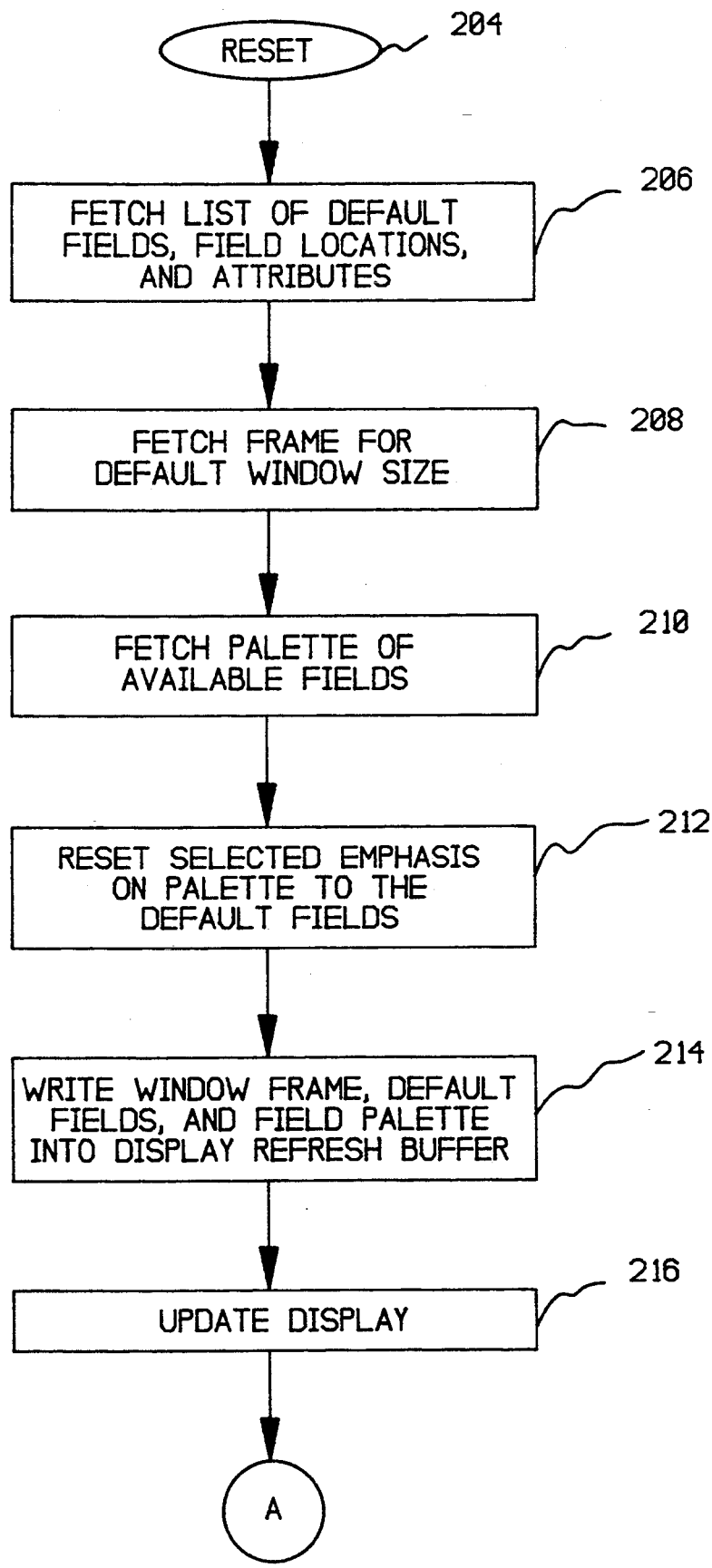

FIG. 11 presents in flowchart form an exemplary reset operation which resets a display configuration to a previous, perhaps initial, display configuration. The process begins at software block 104, and continues at software block 206, wherein data processing system 10 fetches a list of default fields, field locations, and attributes in response to the user selection of the reset operation. In accordance with software block 208, the frame for the default window size is fetched by data processing system 10. Next, in accordance with software block 210, data processing system 10 fetches the palette of available fields. The selected emphasis in the menu field palette 56 is reset to the default fields, in accordance with software block 212. Finally, in accordance with software blocks 214, 216, the window frame, default fields, and field palette are written into a display refresh buffer, and periodically updated.

It is appropriate to note that the present invention allows an end-user with the capabilities to rearrange either or both of (1) the content, and (2) the physical arrangement of menu fields in the particular menu-formatted graphical user interface.

While the invention has been particularly shown and described with reference to a preferred embodiment, it will be understood by those skilled in the art that various changes in form and detail may be made therein without departing from the spirit and scope of the invention.

I claim:

1. A method in a data processing system of providing a graphical user interface to facilitate operator interaction with said data processing system, comprising the method steps of:

providing a menu-formatted graphical user interface including a plurality of menu fields whose identity and display positions are determined by an initial display configuration and which are adapted to receive alphanumeric input from a keyboard;

simultaneously providing in said graphical user interface a menu field palette which includes at least one iconographic representation of at least one additional possible menu fields which is adapted to receive alphanumeric input from a keyboard;

monitoring operator input, and performing at least one of the following tasks in response to a predetermined operator input:

(a) including a particular one of said at least one additional possible menu fields from said menu field palette in said menu-formatted graphical user interface in response to operator selection of said at least one iconographic representation of said at least one additional possible menu fields;

(b) removing a particular one of said plurality of menu fields from said menu-formatted graphical user interface;

(c) automatically providing visual representations in said menu field palette of particular menu fields of said plurality of menu fields which are included or removed from said menu-formatted graphical user interface;

utilizing said steps of including and removing to rearrange or alter at least one of (a) menu content in said menu-formatted graphical user interface, and (b) menu item positions in said menu-formatted graphical user interface; and receiving alphanumeric input from a keyboard in particular ones of said plurality of menu fields.

2. A method according to claim 1, wherein said at least one additional possible menu fields of said menu field palette are represented in said menu-formatted graphical user interface in at least one of (a) an iconographic representation format, and (b) a textual representation format.

3. A method according to claim 1, wherein said menu field palette is automatically provided as a component of said menu-formatted graphical user interface.

4. A method according to claim 1, further comprising:

permanently modifying said initial display configuration in response to said operator input; and thereafter displaying a menu-formatted graphical user interface including a plurality of menu fields whose identity and display positions are determined by the permanently modified initial display configuration.

5. A method according to claim 1, further comprising:

reversibly modifying said initial display configuration in response to said operator input;

displaying a menu-formatted graphical user interface including a plurality of menu fields whose identities and display positions are determined by the reversibly modified initial display configuration; and reverting to said initial display configuration in response to a predetermined operator input.

6. A method according to claim 1, wherein:

said step of including a particular one of said at least one additional possible menu fields from said menu field palette in said menu-formatted graphical user interface is accomplished by a direct manipulation operation performed by an operator.

7. A method according to claim 6, wherein said direct manipulation operation comprises a drag-and-drop operation involving a particular one of said at least one additional possible menu fields from said menu field palette.

8. A method according to claim 1, wherein:

each of said at least one additional possible menu fields is associated with at least one display attribute;

during said step of including a particular one of said at least one additional possible menu fields from said menu field palette in said menu-formatted graphical user interface, said at least one display attribute is implemented in display of said graphical user interface.

9. A method according to claim 1, further comprising:

automatically enabling operator interaction with a particular menu field of said at least one additional possible menu fields upon completion of said step of including said particular menu field of said at least one additional possible menu fields from said menu field palette into said menu-formatted graphical user interface.

10. A method according to claim 9, further comprising:

automatically disabling operator interaction with a particular menu field of said menu-formatted graphical user interface upon completion of said step of removing said particular one of said plurality of menu fields from said menu-formatted graphical user interface.

11. A method according to claim 1, wherein:

said step of removing a particular one of said plurality of menu fields is accomplished by a direct manipulation operation performed by an operator.

12. A method according to claim 1, further comprising:

automatically adjusting sizing of said graphical user interface in a display of said data processing system in response to operator-initiated inclusion or removal of particular menu fields.

13. A method according to claim 1, further comprising:

automatically adjusting sizing of visual components of said graphical user interface in a display of said data processing system in response to operator-initiated inclusion or removal of particular menu fields.

14. A means in a data processing system of providing a graphical user interface to facilitate operator interaction with said data processing system, comprising:

means for providing a menu-formatted graphical user interface including a plurality of menu fields whose identity and display positions are determined by an initial display configuration and which are adapted to receive alphanumeric input from a keyboard;

means for simultaneously providing in said graphical user interface a menu field palette which includes at least one iconographic representation of at least one additional possible menu fields which is adapted to receive alphanumeric input from a keyboard;

means for monitoring operator input, and performing at least one of the following tasks in response to a predetermined operator input:

(a) including a particular one of said at least one additional possible menu fields from said menu field palette in said menu-formatted graphical user interface in response to operator selection of said at least one iconographic representation of said at least one additional possible menu fields;

(b) removing a particular one of said plurality of menu fields from said menu-formatted graphical user interface;

(c) automatically providing visual representations in said menu field palette of particular menu fields of said plurality of menu fields which are included or removed from said menu-formatted graphical user interface;

means for utilizing said steps of including and removing to rearrange or alter at least one of (a) menu content in said menu-formatted graphical user interface, and (b) menu item positions in said menu-formatted graphical user interface.

* * * * *